United States Patent
Miller

[15] 3,672,125
[45] June 27, 1972

[54] NTA SOLID SUPPORT FOR HYDROGEN SULFIDE REMOVAL

[72] Inventor: Richard C. Miller, Chicago, Ill.
[73] Assignee: Nalco Chemical Company, Chicago, Ill.
[22] Filed: Jan. 28, 1971
[21] Appl. No.: 110,611

[52] U.S. Cl.............................................55/73, 23/25, 55/75
[51] Int. Cl...........................................................B01d 53/34
[58] Field of Search........................55/73, 74, 75; 23/2.5, 3 L

[56] References Cited

UNITED STATES PATENTS 3,363,401  1/1968  Pieme et al. ...............................55/73

FOREIGN PATENTS OR APPLICATIONS 769,854  3/1957  Great Britain

Primary Examiner—Charles N. Hart
Attorney—John G. Premo, Charles W. Connors, Edward A. Ptacek and John S. Roberts, Jr.

[57] ABSTRACT

A method of removing hydrogen sulfide from gaseous streams by means of a nitrilotriacetic acid-ferric complex sorbed on a silica-alumina support.

5 Claims, No Drawings

NTA SOLID SUPPORT FOR HYDROGEN SULFIDE REMOVAL

INTRODUCTION

In many industrial processes, hydrogen sulfide is given off in the waste gas. These gases often cause an air pollution problem, as well as an odor nuisance. Due to recent concern with the prevention of further air pollution, this problem has become acute. In the paper industry in particular, this is a serious problem. For instance, in Kraft paper mills, the recovery boilers which are operating under reducing conditions evolve hydrogen sulfide with the stack gases. Stack gases can contain as high as 1000 ppm hydrogen sulfide. Since some air pollution authorities are requiring a reduction to a maximum of 70 ppm now and to a maximum of 17.5 ppm in the near future, a method of removing the hydrogen sulfide from the stack gas is necessary.

It is often necessary to remove hydrogen sulfide from many other gaseous streams for reasons other than pollution control. For instance, hydrogen sulfide should be removed from natural, industrial, and process gaseous streams. Refinery waste gases and coke oven gases contain hydrogen sulfide and it may often be necessary to remove this contaminant.

Some methods are known in the prior art for removing hydrogen sulfide. For instance, Meuly et al, U.S. Pat. No. 3,226,320 teaches complexing iron or certain other polyvalent metals with a chelating agent such as ethylene diamine tetraacetic acid (EDTA) and contacting this complex with the gaseous stream. One of the main disadvantages of this is that the solution is not stable. If the fluid stream has a very low pH, the performance of the complex drops off appreciably.

The prior art also discloses three Czechoslovakian patents, Nos. 117,277; 117,274 and 117,273. These references teach the removing of the hydrogen sulfide from the gas using a solution of a complex formed from nitrilotriacetic acid and ferric ion. But again, the main disadvantage is that this solution is not stable. These references even teach that the main disadvantage is the instability of the ferric ion complex. In order to overcome this instability, the references teach the use of mixtures of certain chelating agents, such as nitrilotriacetic acid and diethylene triamine pentaacetic acid. However, this was not a satisfactory solution to the problem of instability.

The present invention overcomes the disadvantages of the prior art by providing a solid, stable complex or chelate utilized in acid contact media for removal of $H_2S$ from industrial stack gases. The disadvantages of a solution are hereby overcome. Further, the present invention, by sorption on a typical support of the silica/alumina type, enables the advantages of the present invention to be transferred to a dry system such as a cartridge which is commercially mobile and can be readily transported to the area of need. Another advantage of the present invention is that the chemical is a solid and not a solution and thus can be used to treat dry gases.

THE SOLUTION

The active component treating solution is prepared by complexing in aqueous solution nitrilotriacetic acid (NTA) with a ferric salt solution, viz., ferric chloride preadjusted to a pH of about 5.0 to 6.5 with caustic such as NaOH. Although NTA is preferred, glycolic acid, diglycolic acid and ethylenediamine tetraacetic acid are operable and their complexes form similarly with ferric salts and this reaction is well known. The treating solution will contain from about 0.005 to 20 percent by weight of the complex and preferably is utilized in a concentration of about 0.1 to 1 percent by weight of the complex.

The treating solution may utilize a water-soluble organic solvent or diluent selected from dimethyl formamide (DMF) and dimethyl sulfoxide (DMSO). This solvent may be present in a weight percent of from about 0 to 75 percent.

A preferred method uses a stabilized complex. In order to stabilize the complex which is short lived in a strongly acid environment especially below a pH of about 4, the treating solution can be buffered with an alkali metal carbonate or bicarbonate to raise and maintain the pH in the range of about 5.0 to 6.5. The amount of buffering agent that can be utilized preferably ranges from about 0.05 to 10.0 percent by weight.

THE SUPPORT

As stated in Emmett, P.H. (Catalysts I, 245 [1954]), "The mechanical function of a carrier is to act as a base or framework"— and here the support is utilized in the same manner as with a catalyst, to sorb and support the complex— preferably the nitrilotriacetic acid-ferric complex.

INCORPORATION OF THE SOLUTION ON THE SUPPORT

The melding of the treating solution and the selected support may be achieved by conventional means as by spraying or sprinkling on the solution with rotation of support or spraying angle. This method is a method of choice with the less porous supports. In the case of numerous highly-porous supports integrated into the present invention, impregnation may be used as a method where the solution is mixed with the support to assure a coating or application in the desired form on both the external and internal surfaces and so that a considerable body of the liquid is sorbed on and within the support. In using this a gentle warming may be incorporated but care must be used to avoid a breakdown of the complex and this is different from the criteria for catalysts.

Among preferred support materials are oxides of silica, alumina, and silica/alumina or in other words, a support which contains at least one oxide of a metal selected from silicon and aluminum. A most preferred support is one fashioned from silica/alumina microspheres of an effective diameter of about +100 to +300 mesh. Spheres termed pellets may be utilized in sizes up to +10 mesh. The term "microsphere" is herein defined to cover the particle size range of about +100 to +300 mesh. Definition and preparation of microspheres and pellets of larger size are set out in U.S. Pat. No. 3,024,206, Duke (Minerals and Chemicals).

Other specific preferred supports are a high $Al_2O_3$/low $SiO_2$ product denoted HA and a low $Al_2O_3$/high $SiO_2$ product denoted MSD-B of Nalco Chemical Company, Chicago, Illinois.

These specific support materials may also be referred to as high alumina/low silica and low alumina/high silica sorptive clays and are preferably utilized in the form of microspheres.

Generally, a porous, high area support is preferred with a commercial preference weighted towards support materials utilizable in fluid catalyst techniques. Additionally, diatomaceous earth, silica gel, kaolin, bauxite, halloysite, attapulgite, alumina gel, silica-alumina gel, silica-magnesia gel, porous glass spheroids, etc., are operable support materials.

An additional preferred material useful as a support which has natural or synthetic origin are a group of crystalline metal aluminosilicates known in the trade as molecular sieves for their ability to selectively capture or refuse liquids and gases of different molecular structure. A generalized formula for these materials is as follows:

$$M\ O:Al_2O_3 \cdot x\ SiO_2 : y\ H_2O$$

where M represents at least one cation and $n$ is its valence.

Illustrative sieves of synthetic origin are usually alphabetically designated A, X, Y, etc. (Carbide) and are commercially available. Patents illustrating the preparation and designation of molecular sieves are U.S. Pat. Nos. 2,589,945; 2,882,243; 2,882,244 and 2,931,167 (Carbide).

ACTION ON THE GAS STREAM

It is believed that reaction that takes place when an $H_2S$ stream is passed through or over the support-complex in a canister or container is an oxidation-reduction mechanism wherein the sulfide is oxidized to elemental sulfur and the ferric cation is reduced to the dark colored ferrous state. The ferric ion complex can be regenerated by a conventional oxidizing agent such as oxygen, ozone, etc. Further, there is evidence that the complex may act in a catalytic fashion.

EXAMPLE I

Preparation of the Treating Solution

One hundred pounds of ferric chloride solution, 42° B., (40% $FeCl_3$) was placed in a mixing container. Ten pounds of sodium hydroxide pellets were dissolved in 240 pounds of water (29 gal.) in another mixing container. The caustic solution was then slowly added to the ferric chloride solution with stirring. An additional 383.75 pounds (46 gal.) of water was added. Finally, 66.25 pounds of nitrilotriacetic acid was added at room temperature to the mixing tank and stirred until all was dissolved. This adsorbing solution contains 10 percent by weight of the complex. As is often necessary, the solution can be diluted for use in this invention to make a solution even as low as 0.005 percent by weight of the complex.

EXAMPLE II

To the solution of Example I above, in successive runs 20 percent by weight of dimethyl formamide (DMF) and 20 percent by weight of dimethyl sulfoxide (DMSO) were added to provide a water-soluble organic solvent which has been found to assist the performance of the complexing solution.

EXAMPLE III

A gas stream containing 2 percent $H_2S$, 4 percent $CO_2$ and 94 percent air was passed through a cylinder or canister packed with about 100 pounds high alumina/low silica microspheres (Nalco HA) loaded with a 0.1 percent by weight NTA-ferric complex also made up with DMF solvent as prepared in Examples I and II above. After about one pound of $H_2S$ had been removed from the gas stream, the cylinder was taken off-stream and the complex was regenerated by ozone treatment and later re-used without appreciable diminution of results.

EXAMPLE IV

A gas stream containing 2 percent $H_2S$, 4 percent $CO_2$ and 94 percent air was passed through a cylinder packed with low alumina/high silica microspheres (Nalco MSD-B) loaded with a 1 percent by weight NTA-ferric complex treating solution containing DMSO as prepared in Examples I and II. After about one pound of $H_2S$ had been removed from the gas stream, the cylinder was taken off-stream and the complex was regenerated by oxygen treatment and later re-used without appreciable diminution of results. It was found that 100 pounds of the loaded support was able to remove about one pound of $H_2S$ and in this example, 100 pounds of the support sorbed 41.2 pounds of the NTA-ferric treating solution which contained 0.7 pounds of iron.

EXAMPLE V

The procedure of Example IV was repeated utilizing (a) X type sieve and (b) Y type sieve, both products of Union Carbide and art recognized. The $H_2S$ removal from the gas in each case was similar in quantity to Example IV and the cylinders were regenerated by forced air.

EXAMPLE VI

The treating solution was prepared the same way as Example I. Then, as a buffering solution, sodium carbonate was added to the complexing solution above until the pH was adjusted to between about 5 to 6.5. When the solution was used to remove $H_2S$ from a gas stream, continuous addition of sodium carbonate was maintained as necessary.

EXAMPLE VII

The treating solution after being buffered as in Example VI was used to treat a gas stream in the same way as Example III. The results were the same except for the fact that the complex seemed to be more stable.

EXAMPLE VIII

To the treating solution after being buffered as in Example VI was added 20 percent by weight of dimethyl formamide. This solution was then used to treat a gas stream in the same manner as Example III. The results showed very good removal of $H_2S$.

EXAMPLE IX

Example VIII was repeated except that a pure $H_2S$ gas stream was used. The results showed very good removal of $H_2S$.

The embodiments of the invention in which an exclusive property or privilege is claimed are defined as follows:

1. A method of removing hydrogen sulfide from gaseous streams comprising contacting said stream with a treating solution of a nitrilotriacetic acid-ferric ion complex sorbed on a silica-alumina support wherein the silica-alumina support consists of an inorganic oxide support consisting of at least one oxide of a metal selected from silicon and aluminum.

2. A method according to claim 1 wherein the support is a high alumina/low silica sorptive clay in the form of microspheres.

3. A method according to claim 1 wherein the support is a low alumina/high silica sorptive clay in the form of microspheres.

4. A method according to claim 1 wherein the support is a crystalline metal aluminosilicate.

5. A method according to claim 1 wherein the treating solution is buffered to maintain a pH in the range of from about 5.0 to 6.5 utilizing an alkali metal carbonate.

* * * * *